(12) United States Patent
Liang et al.

(10) Patent No.: US 8,729,178 B2
(45) Date of Patent: May 20, 2014

(54) POLYSILOXANE-GRAFTED POLYIMIDE RESIN COMPOSITION AND APPLICATIONS THEREOF

(71) Applicant: Chi Mei Corporation, Tainan (TW)

(72) Inventors: Yu-Hao Liang, Kaohsiung (TW); Li-Tao Hsu, Kaohsiung (TW); Huai-Pin Hsueh, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/664,318

(22) Filed: Oct. 30, 2012

(65) Prior Publication Data

US 2013/0109803 A1     May 2, 2013

(30) Foreign Application Priority Data

Nov. 1, 2011 (TW) .............................. 100139784 A

(51) Int. Cl.
*C08G 77/455* (2006.01)
(52) U.S. Cl.
USPC ............................ 524/588; 525/393; 525/431
(58) Field of Classification Search
USPC ................... 524/588; 525/393, 431
See application file for complete search history.

(56) References Cited

U.S. PATENT DOCUMENTS 5,527,862 A * 6/1996 Itoh et al. ...................... 525/393

FOREIGN PATENT DOCUMENTS

| JP | 7-62235 | 3/1995 |
| JP | 7-62236 | 3/1995 |
| JP | 2002-293933 A | 10/2002 |

* cited by examiner

*Primary Examiner* — Nicole M Buie-Hatcher
*Assistant Examiner* — Chelsea M Lowe
(74) *Attorney, Agent, or Firm* — Jianq Chyun IP Office

(57) ABSTRACT

A polysiloxane-grafted polyimide resin composition includes a polysiloxane-grafted polyimide resin, and a solvent. The polysiloxane-grafted polyimide resin is represented by formula (I):

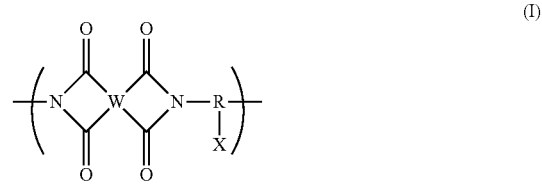

wherein
W represents a tetravalent organic group,
R represents a trivalent organic group, and
X represents a polysiloxane-containing group.

12 Claims, No Drawings

POLYSILOXANE-GRAFTED POLYIMIDE RESIN COMPOSITION AND APPLICATIONS THEREOF

CROSS-REFERENCE TO RELATED APPLICATION

This application claims priority of Taiwanese Application No. 100139784, filed on Nov. 1, 2011.

BACKGROUND OF THE INVENTION

1. Field of the Invention

This invention relates to a resin composition, more particularly to a resin composition comprising a polysiloxane-grafted polyimide resin. This invention also relates to a flexible substrate formed from the resin composition.

2. Description of the Related Art

Recently, organic polymer materials have been widely used in various electronic components or devices so as to enhance various characteristics (for example, electrical insulation, heat resistance, mechanical property, etc.) of the electronic components or devices. Among them, polyimide polymer is most widely used in view of good mechanical and electrical properties. However, it is increasingly required to raise the properties and performances of the electronic components or devices in the art. Therefore, the mechanical properties (for example, flexibility, extensibility, etc.), the thermal properties (for example, low thermal expansion coefficient), insulation, or adhesion of polyimide polymer are required to be improved.

Conventionally, the physical properties, especially thermal or mechanical property, of polyimide polymer are modified by adding various reinforcing materials so as to enhance the applicability of polyimide polymer. Commonly used reinforcing materials include titanium dioxide, silicon dioxide, talc, etc. However, such a modification manner has problems in mixing homogeneity and compatibility. Furthermore, a flexible substrate formed therefrom may have a cloudy appearance.

JP2002-293933 discloses an alkoxy group-containing silane modified polyamic acid resin composition useful as an adhesive for a printed circuit board. The polyamic acid resin composition comprises an alkoxy group-containing silane modified polyamic acid resin and a solvent. The alkoxy group-containing silane modified polyamic acid resin is obtained by subjecting a polyamic acid and an epoxy group-containing alkoxysilane partial condensate to a reaction. The reaction is conducted between a carboxylic acid group of polyamic acid and an epoxy group of the alkoxysilane partial condensate so that the alkoxysilane partial condensate is bonded to a tetracarboxylic dianhydride moiety of the polyamic acid. However, when the alkoxy group-containing silane modified polyamic acid resin is further processed by heating, the alkoxy group-containing silane moiety on the polyamic acid resin would be dissociated therefrom. Therefore, the flexible substrate obtained after the subsequent processing may not have satisfactory mechanical and thermal properties, especially when being used for a flexible substrate for a flexible liquid crystal display or a flexible electronic book.

It is desirable in the art to provide a resin composition for forming a flexible substrate having satisfactory mechanical and thermal properties for an electronic device.

SUMMARY OF THE INVENTION

Therefore, a first object of the present invention is to provide a resin composition which can be formed into a flexible substrate having superior thermal and mechanical properties.

A second object of the present invention is to provide such a flexible substrate.

According to a first aspect of this invention, there is provided a polysiloxane-grafted polyimide resin composition including:

a polysiloxane-grafted polyimide resin of formula (I):

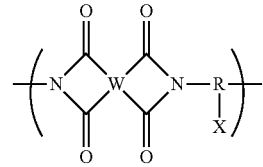

(I)

wherein
W represents a tetravalent organic group,
R represents a trivalent organic group, and
X represents a polysiloxane-containing group;
and
a solvent.

According to a second aspect of this invention, there is provided a flexible substrate formed from the polysiloxane-grafted polyimide resin composition.

DETAILED DESCRIPTION OF THE PREFERRED EMBODIMENTS

Polysiloxane-Grafted Polyimide Resin Composition and Preparation Thereof

The polysiloxane-grafted polyimide resin composition according to the present invention includes:

a polysiloxane-grafted polyimide resin of formula (I):

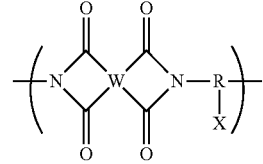

(I)

wherein
W represents a tetravalent organic group,
R represents a trivalent organic group, and
X represents a polysiloxane-containing group;
and
a solvent.

Examples of the tetravalent organic group include, but are not limited to, a tetravalent aliphatic group, a tetravalent alicyclic group, and a tetravalent aromatic group. Preferably, the tetravalent organic group is selected from

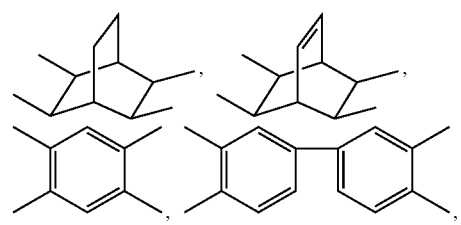

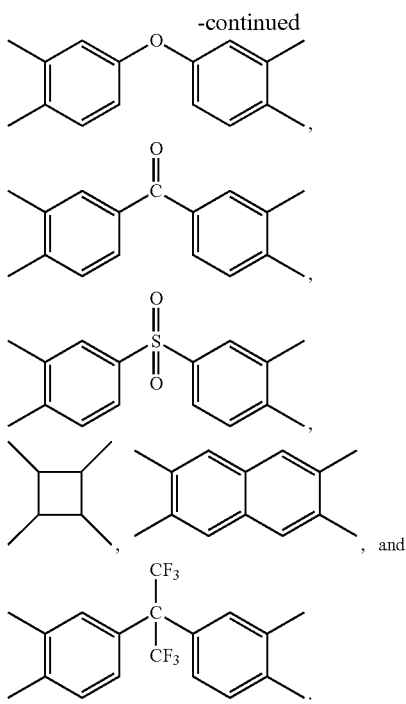

The trivalent organic group is preferably selected from a trivalent aliphatic group, a trivalent alicyclic group, a trivalent aromatic group, and combinations thereof. Any of the organic groups can be optionally substituted by a substituent preferably selected from hydrogen, hydroxyl, halogen, and combinations thereof.

Preferably, X is represented by:

wherein
$X^1$ represents a formula of

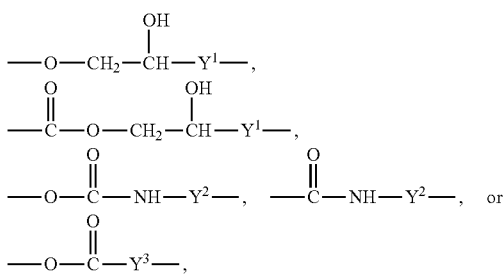

wherein $Y^1$ and $Y^3$ independently represent an unsubstituted or substituted $C_1$-$C_{13}$ alkylene group, an unsubstituted or substituted $C_6$-$C_{12}$ arylene group, or an unsubstituted or substituted $C_7$-$C_{12}$ aralkylene group, and $Y^2$ represents an unsubstituted or substituted $C_1$-$C_{13}$ alkylene group, wherein part of methylene groups of said alkylene group is optionally replaced by oxygen atoms with the proviso that when some methylene groups are replaced by oxygen atoms, a structure in which two oxygen atoms adjoin together is excluded, and $X^2$ represents a polysiloxanyl group.

Examples of the substituent of the substituted $C_1$-$C_{13}$ alkylene group, the substituted $C_6$-$C_{12}$ arylene group, or the substituted $C_7$-$C_{12}$ aralkylene group include, but are not limited to, an alkyl group, glycidyl, a glycidyl-containing group, glycidoxy, a glycidoxy-containing group, hydroxyl, a hydroxyl-containing group, and the like.

Examples of the arylene group include, but are not limited to, phenylene, naphthylene, and the like.

Examples of the aralkylene group include, but are not limited to,

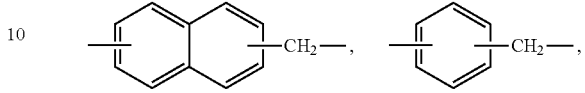

and the like.

Preferably, $Y^1$ represents an unsubstituted or substituted $C_1$-$C_{13}$ alkylene group.

Preferably, $Y^3$ represents an unsubstituted or substituted $C_6$-$C_{12}$ arylene group.

Preferably, $Y^2$ represents an unsubstituted $C_1$-$C_{13}$ alkylene group.

Preferably, the polysiloxane-containing group has a silicon content ranging from 0.005 mole to 35 moles based on 1 mole of the polysiloxane-grafted polyimide resin.

Preferably, the polysiloxane-grafted polyimide resin has a molecular weight ranging from 30,000 to 1,000,000.

Preferably, the polysiloxane-grafted polyimide resin composition according to the present invention further includes a polysiloxane-grafted polyamic acid resin of formula (II):

wherein

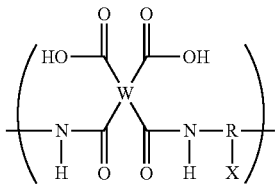

(II)

W, R, and X in formula (II) are as defined in formula (I).

Preferably, the polysiloxane-grafted polyimide resin is in an amount not less than 70 wt % based on 100 wt % of a combination of the polysiloxane-grafted polyimide resin and the polysiloxane-grafted polyamic acid resin.

Preferably, the solvent used in the polysiloxane-grafted polyimide resin composition of the present invention is selected from N-methyl-2-pyrrolidone, γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylethanamide, and combinations thereof.

Additives commonly used in the art may be added to the polysiloxane-grafted polyimide resin composition of the present invention as long as the intended properties of the polysiloxane-grafted polyimide resin composition are not impaired. Examples of the additives include, but are not limited to, plasticizers, weathering agents, fillers, viscosity modifiers, surface modifying agents, antioxidants, defoaming agents, coloring agents, heat stabilizers, adhesion promoters, releasing agents, and the like. The additives can be used alone or in admixture of two or more.

Preferably, the additive is used in an amount ranging from 0.1 part by weight to 40 parts by weight based on 100 parts by weight of the polysiloxane-grafted polyimide resin and the polysiloxane-grafted polyamic acid resin. Examples of the fillers include, but are not limited to, silicon dioxide (for example, commercially available products such as IPA-ST (particle size: 12 nm), EG-ST (particle size: 12 nm), IPA-ST-L (particle size: 45 nm), and IPA-ST-ZL (particle size: 100 nm) manufactured by Nisson Chemical), aluminum oxide, talc, calcium carbonate, calcium sulfate, barium sulfate, titanium dioxide, and the like. The fillers can be used alone or in admixture of two or more.

Examples of the adhesion promoters include, but are not limited to, (3-glycidoxypropyl)trimethoxysilane (for example, commercially available products such as KBM-403 manufactured by Shin-Etsu Chemical Co., Ltd), 3-glycidoxypropylmethyldiethoxysilane, 3-glycidoxypropyltriethoxysilane, and the like. The adhesion prompters can be used alone or in admixture of two or more.

Examples of the antioxidants include, but are not limited to, dibutylhydroxytoluene (for example, commercially available products such as BHT manufactured by TCI), 2,6-di-tert-butylphenol, and the like. The antioxidants can be used alone or in admixture of two or more.

When the fillers are used, the flexible substrate made from the polysiloxane-grafted polyimide resin composition has relatively low thermal expansion coefficient.

There is no specific limitation to the method for preparing the polysiloxane-grafted polyimide resin composition of the present invention. For example, the polysiloxane-grafted polyimide resin composition of the present invention can be made using a general mixing method. That is, the polysiloxane-grafted polyimide resin, the solvent, the optional polysiloxane-grafted polyamic acid resin, and the optional additives are stirred using a stirrer until a homogeneous mixture is obtained.

The viscosity of the polysiloxane-grafted polyimide resin composition of the present invention can be adjusted according to the specific coating method to be used. Preferably, the viscosity ranges from 1 cp to 20,000 cps.

Polysiloxane-Grafted Polyimide Resin and Preparation Thereof:

Preferably, the polysiloxane-grafted polyimide resin is obtained by a process including the steps of:

(a) subjecting a tetracarboxylic dianhydride component of formula

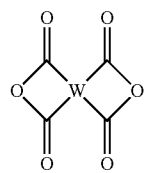

and a diamine component including a diamine compound of formula

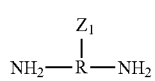

to a polymerization reaction followed by a dehydration/ring-closure reaction to form a polymerization reaction product of formula

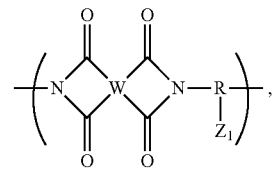

wherein
W and R are as defined in formula (I), and
$Z_1$ is a monovalent group; and (b) subjecting said polymerization reaction product and polysiloxane containing a group $Z_2$ to a reaction to produce the polysiloxane-grafted polyimide resin,
wherein
$Z_2$ is a monovalent group reactive with $Z_1$ to undergo the reaction.

Specifically, the anhydride groups of the tetracarboxylic dianhydride component and the amino groups of the diamine compound of formula

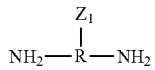

are subjected to the polymerization reaction followed by the dehydration/ring-closure reaction to form the polymerization reaction product containing the group $Z_1$. The $Z_1$ group of the polymerization reaction product and the $Z_2$ group of the polysiloxane are subjected to the reaction to produce the polysiloxane-grafted polyimide resin.

In the polymerization reaction, the equivalent ratio of the anhydride group of the tetracarboxylic dianhydride component to the amino group of the diamine component ranges preferably from 0.2 to 2, and more preferably from 0.3 to 1.2.

The operating conditions, e.g., the reaction temperature and the reaction period, for the polymerization and the dehydration/ring-closure reaction can be those commonly used in the art. Preferably, the polymerization is conducted at a temperature ranging from 0° C. to 100° C. for a period ranging from 1 hour to 24 hours, and the dehydration/ring-closure reaction is conducted at a temperature ranging from 30° C. to 200° C. for a period ranging from 0.5 hour to 50 hours.

There is no particular limitation to the solvent for the polymerization reaction as long as the solvent is able to dissolve the reactants and the products. Preferably, examples of the solvents include aprotic polar solvents, such as N-methyl-2-pyrrolidone, N,N-dimethylacetamide, N,N-dimethylformamide, dimethylsulfoxide, γ-butyrolactone, tetramethylurea, hexamethylphosphoric acid triamide, and the like; and phenolic solvents, such as meta-cresol, xylenol, phenol, halogenated phenols, and the like.

The dehydration/ring-closing reaction is implemented by heating in the presence of a dehydrating agent and an imidization catalyst so as to convert the amic acid functional group produced in the polymerization reaction to the amide functional group (i.e., an imidization reaction).

When the imidization degree of polyamic acid is larger than 70%, the flexible substrate formed from the polysiloxane-grafted polyimide resin composition has better thermal and mechanical properties.

The dehydrating agent suitable for the dehydration/ring-closing reaction is selected from an acid anhydride compound, such as acetic anhydride, propionic anhydride, trifluoroacetic anhydride, and the like. The used amount of the dehydrating agent is preferably from 0.01 to 20 moles based on 1 mole of the polyamic acid. The imidization catalyst suitable for the dehydration/ring-closing reaction is selected from pyridine compounds, such as pyridine, trimethylpyridine, dimethylpyridine, or the like; and tertiary amines, such as triethylamine, or the like. The used amount of the imidization catalyst is preferably from 0.5 to 10 moles based on 1 mole of the dehydrating agent.

Preferably, the reaction of the polymerization reaction product containing the group $Z_1$ with the polysiloxane containing the group $Z_2$ is conducted by heating in the presence of a catalyst. Examples of the catalyst includes, but are not limited, to (1) tertiary amine compounds, such as 1,8-diazabicyclo[5,4,0]-7-undecene, triethylenediamine, benzyldimethylamine, triethanolamine, dimethylethanolamine, tris(dimethylaminomethyl)phenol, and the like; (2) imidazole compounds, such as 2-methylimidazole, 2-phenylimidazole, 2-phenyl-4-methylimidazole, 2-heptadecylimidazole, benzimidazole, and the like; (3) organic phosphine compounds, such as tributylphosphine, methyldiphenylphosphine, triphenylphosphine, diphenylph osphine, phenylphosphine, and the like; and (4)tetraphenyl borate compounds: tetraphenylphosphonium tetraphenylborate, 2-ethyl-4-methylimidazole tetraphenylborate, N-methylmorpholine tetraphenylborate, and the like.

The solvent for conducting the reaction of the polymerization reaction product containing the group $Z_1$ with the polysiloxane containing the group $Z_2$ is not specifically limited as long as the polymerization reaction product, the polysiloxane, and the product formed thereby can be dissolved in the solvent. Examples of the solvent include, but are not limited to, (1) aprotic polar solvents, such as N-methyl-2-pyrrolidone, N,N-dimethylacetamide, N,N-dimethylformamide, dimethylsulfoxide, γ-butyrolactone, tetramethylurea, hexamethylphosphoric acid triamide, and the like; and (2) phenolic solvents, such as meta-cresol, xylenol, phenol, halogenated phenols, and the like.

The aforesaid reaction of the polymerization reaction product with the polysiloxane is conducted at a temperature ranging preferably from 50° C. to 120° C., and more preferably from 60° C. to 100° C.

The equivalent ratio of the $Z_2$ group of the polysiloxane to the $Z_1$ group of the polymerization reaction product ranges preferably from 0.01 to 0.4.

Preferably, the polysiloxane-grafted polyamic acid resin of formula (II) is obtained by a process including the steps of:

(1) subjecting a tetracarboxylic dianhydride component of formula

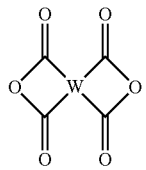

and a diamine component including a diamine compound of formula

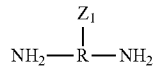

to a polymerization reaction to form a polymerization reaction product of formula

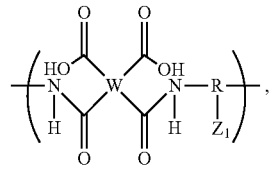

wherein
W, R, and $Z_1$ are as defined in formula (I); and
(2) subjecting said polymerization reaction product and polysiloxane containing a group $Z_2$ to a reaction to produce the polysiloxane-grafted polyamic resin,
wherein
X, and $Z_2$ are as defined in formula (I).

The polymerization reaction can be controlled by adjusting the reaction temperature or period so that the polymerization reaction product obtained thereby may contain polyamic acid, polyimide, or a mixture of polyamic acid and polyimide.

Tetracarboxylic Dianhydride Component:

Examples of the tetracarboxylic dianhydride component suitable for the present invention include, but are not limited to, aliphatic tetracarboxylic dianhydride, alicyclic tetracarboxylic dianhydride, and aromatic tetracarboxylic dianhydride. These teracarboxylic dianhydride compounds may be used alone or in admixture of two or more.

Examples of aliphatic tetracarboxylic dianhydride include, but are not limited to, ethanetetracarboxylic dianhydride, butanetetracarboxylic dianhydride, and the like. These aliphatic tetracarboxylic dianhydride may be used alone or in admixture of two or more.

Examples of alicyclic tetracarboxylic dianhydride include, but are not limited to, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexanetetracarboxylic dianhydride, cis-3,7-dibutylcycloheptyl-1,5-diene-1,2,5,6-tetracarboxylic dianhydride, 2,3,5-tricarboxylcyclopentylacetic dianhydride, bicyclo[2.2.2]-octa-7-ene-2,3,5,6-tetracarboxylic dianhydride, and the like. These alicyclic tetracarboxylic dianhydride may be used alone or in admixture of two or more.

Examples of aromatic tetracarboxylic dianhydride include, but are not limited to, 3,4-dicarboxy-1,2,3,4-tetrahydronaphthalene-1-succinic acid dianhydride, pyromellitic dianhydride, 3,3',4,4'-benzophenonetetracarboxylic dianhydride, 3,3',4,4'-biphenylsulfonetetracarboxylic dianhydride, 1,4,5, 8-naphthalenetetracarboxylic dianhydride, 2,3,6,7-naphthalenetetracarboxylic dianhydride, 3,3'-4,4'-biphenylethanetetracarboxylic dianhydride, 3,3',4,4'- dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-diphenyltetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl) propane-bis(anhydrotrimellitate), 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3,-dione, 1,3,3a,4,5,9b-hexahydro-7-ethyl-5-(tetrahydro-2,5-dioxo-3-furanyl)-naphtho[1,2-c]-furan-1,3,-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, and the like. These aromatic tetracarboxylic dianhydride may be used alone or in admixture of two or more.

In addition to the aforesaid examples of the tetracarboxylic dianhydride, other examples of the tetracarboxylic dianhydride useful for the present invention include the compounds represented by the following formulas (i-1)-(i-6):

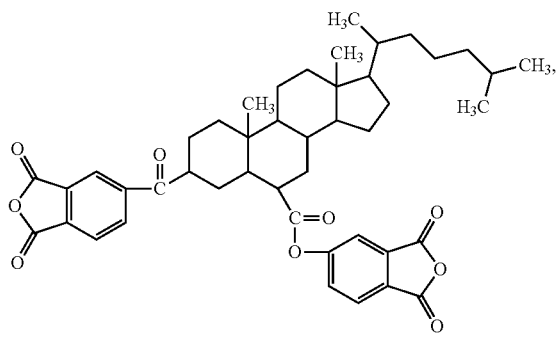
(i-1)

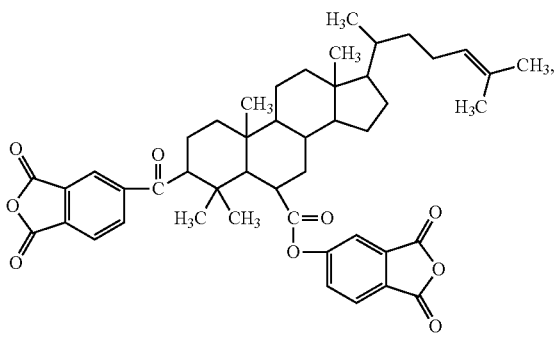
(i-2)

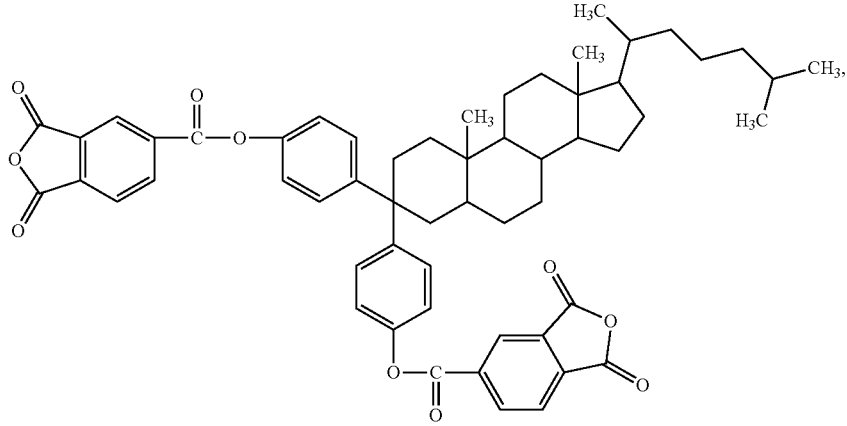
(i-3)

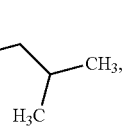

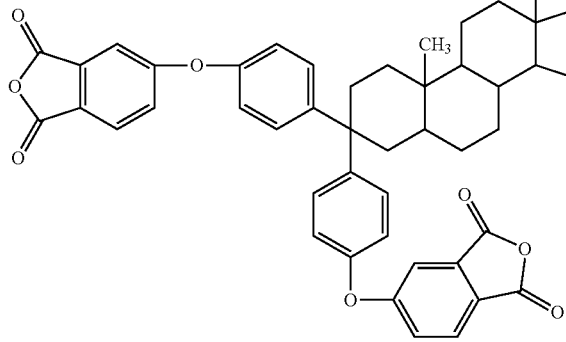

(i-4)

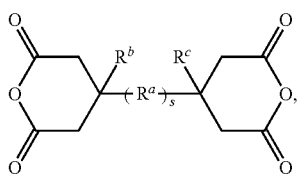

(i-5)

wherein $R^a$ represents a divalent group having an aromatic ring structure; s represents an integer ranging from 1 to 2; and $R^b$ and $R^c$ may be the same or different, and independently represent hydrogen or an alkyl group, and

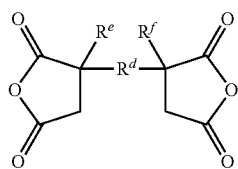

(i-6)

wherein $R^d$ represents a divalent group having an aromatic ring structure; and $R^e$ and $R^f$ may be the same or different, and independently represent hydrogen or an alkyl group.

Preferably, the tetracarboxylic dianhydride represented by formula (i-5) is selected from

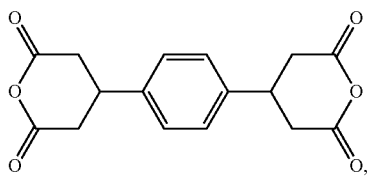

(i-5-1)

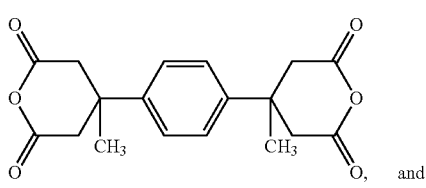

(i-5-2)

and

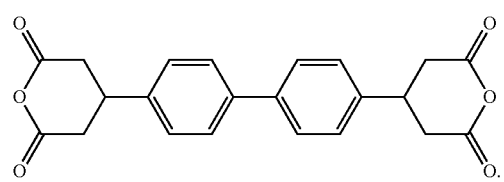

(i-5-3)

Preferably, the tetracarboxylic dianhydride represented by formula (i-6) is

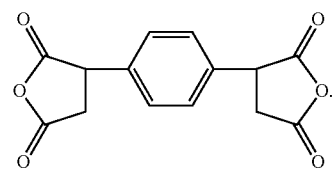

(i-6-1)

Preferably, the tetracarboxylic dianhydride component suitable for the present invention is selected from 1,2,3,4-cyclobutanetetracarboxylic dianhydride, 1,2,3,4-cyclopentanetetracarboxylic dianhydride, 2,3,5-tricarboxycyclopentylacetic dianhydride, 3,4-dicarboxy-1,2,3,4-tetrahydronaphthalene-1-succinic acid dianhydride, pyromellitic dianhydride, 3,3',4,4'-benzophenonetetracarboxylic dianhydride, 3,3',4,4'-diphenylsulfonetetracarboxylic dianhydride, and combinations thereof.

The Diamine Component:

The diamine component includes a diamine compound of formula

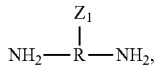

wherein $Z_1$ is defined above.

Examples of the diamine compound of formula

suitable for the present invention include, but are not limited to, aliphatic diamine compounds containing the group $Z_1$, alicyclic diamine compounds containing the group $Z_1$, and aromatic diamine compounds containing the group $Z_1$. These diamine compounds containing the group $Z_1$ may be used alone or in admixture of two or more. Preferably, the $Z_1$ group contained in the diamine compound of formula

is carboxyl, or hydroxyl.

Preferably, the diamine compound of formula

is selected from a compound of formula (ii-1), a compound of formula (ii-2), and a combination thereof.

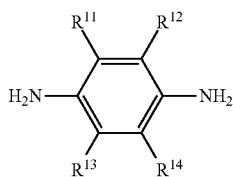

wherein $R^{11}$, $R^{12}$, $R^{13}$, and $R^{14}$ may be the same or different, and independently represent hydrogen, carboxyl, or hydroxyl with the proviso that $R^{11}$, $R^{12}$, $R^{13}$, and $R^{14}$ may not be hydrogen at the same time. Preferably, the diamine compound of formula (ii-1) is selected from 2-hydroxyl-p-diaminobenzene, 2-carboxyl-p-diaminobenzene, 2,5-dihydroxyl-p-diaminobenzene, 2,5-dicarboxyl-p-diaminobenzene, and the like.

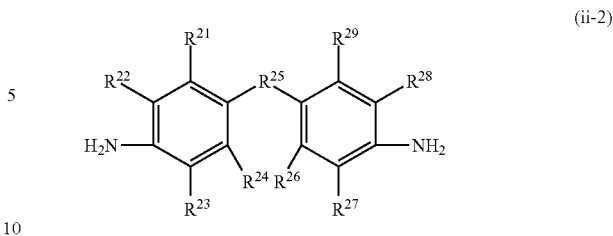

wherein $R^{21}$, $R^{22}$, $R^{23}$, $R^{24}$, $R^{26}$, $R^{27}$, $R^{28}$, and $R^{29}$ may be the same or different, and independently represent hydrogen, methyl, carboxyl, or hydroxyl with the proviso that at least one of $R^{21}$, $R^{22}$, $R^{23}$, $R^{24}$, $R^{26}$, $R^{27}$, $R^{28}$, and $R^{29}$ is carboxyl or hydroxyl, and wherein $R^{25}$ represents a bond, —O—, —S—, —CH$_2$—,

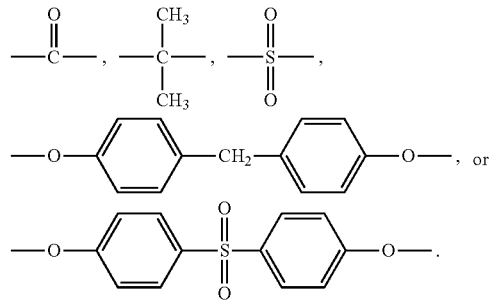

Preferably, the diamine compound of formula (ii-2) is selected from 3,3'-dihydroxyl-4,4'-diaminobiphenyl, 2,2'-dihydroxyl-4,4'-diamino-5,5'-dimethylbiphenyl, 3,3'-dihydroxyl-4,4'-diaminodiphenylmethane, 1,1-bis[4-(3-hydroxyl-4-aminophenoxy)phenyl]methane, 3,3'-dihydroxyl-4,4-diaminodiphenylpropane, 3,3'-dihydroxyl-4,4'-diaminobenzophenonoe, 3,3'-dihydroxyl-4,4'-diaminodiphenylether, 3,3'-dihydroxyl-4,4'-diaminodiphenylsulfone, bis[4-(3-hydroxyl-4-aminophenoxy)phenyl]sulfone, 3,3'-dihydroxyl-4,4'-diaminodiphenylsulfide, 3,3'-dicarboxyl-4,4'-diaminobiphenyl, 2,2'-dicarboxyl-4,4'-diaminobiphenyl, 2,3'-dicarboxyl-4,4'-diaminobiphenyl, 3,3'-dicarboxyl-4,4'-diaminodiphenylmethane, 3,3'-dicarboxyl-4,4'-diamino-5,5'-dimethyldiphenylmethane, 3,3'-dicarboxyl-4,4'-diaminodiphenylpropane, 3,3'-dicarboxyl-4,4'-diaminobenzophenone, 3-carboxyl-4,4'-diaminodiphenylether, 3,3'-dicaroxyl-4,4'-diaminodiphenylether, 3,3'-dicarboxyl-4,4'-diaminodiphenylsulfone, 3,3'-dicarboxyl-4,4'-diaminodiphenylsulfide, and combinations thereof.

Preferably, the diamine compound is selected from 2-hydroxy-p-diaminobenzene, 2-carboxyl-p-diaminobenzene, 2,5-dicarboxyl-p-diaminobenzene, 3,3'-dihydroxy-4,4'-diaminobiphenyl, 3,3'-dihydroxy-4,4'-diaminodiphenylmethane, 3,3'-dihydroxy-4,4'-diaminodiphenylether, 3,3'-dicarboxyl-4,4'-diaminobiphenyl, 3,3'-dicarboxyl-4,4'-diaminodiphenylpropane, 3,3'-dicarboxyl-4,4'-diaminodiphenylether and combinations thereof.

Further diamine compounds other than the aforesaid diamine compounds may be used in combination with the diamine compounds as long as the intended properties of the polysiloxane-grafted polyimide resin composition of the present invention are not impaired.

Examples of the further diamine compounds suitable for the present invention include, but are not limited to, aliphatic diamine compounds, alicyclic diamine compounds, and aromatic diamine compounds. These further diamine compounds may be used alone or in admixture of two or more.

Examples of the aliphatic diamine compounds include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, and the like. These aliphatic diamine compounds may be used alone or in admixture of two or more.

Examples of the alicyclic diamine compounds include, but are not limited to, 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadienylene diamine, tricyclic[6.2.1.0$^{2,7}$]-undecylenedimethylene diamine, 4,4'-methylenebis(cyclohexylamine), and the like. These alicyclic diamine compounds may be used alone or in admixture of two or more.

Examples of the aromatic diamine compounds include, but are not limited to, 4,4'-diaminodiphenylmethane, 4,4'-diaminodiphenylethane, 4,4'-diaminodiphenyl-sulfone, 4,4'-diaminodiphenylether, 3,4'-diamino-diphenylehter, 4,4'-diaminobenzanilide, 1,5-diamino-naphthalene, 5-amino-1-(4'-aminophenyl)-1,3,3-trimethylindane, 6-amino-1-(4'-aminophenyl)-1,3,3-trimethylindane, hexahydro-4,7-methanoindanylene dimethylene diamine, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl)fluorene, 4,4'-methylene-bis(2-chloroaniline), 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]octafluorobiphenyl, 5-[4-(4-n-pentylcyclohexyl)cyclohexyl]phenylmethylene-1,3-diaminobenzene, 1,1-bis[4-4-aminophenoxy)phenyl]-4-(4-ethylphenyl)cyclohexane, and the like. These aromatic diamine compounds may be used alone or in admixture of two or more.

In addition to the aforesaid examples of the diamine compounds, the further diamine compounds useful for the present invention include the compounds represented by the following formulas (ii-3)-(ii-17):

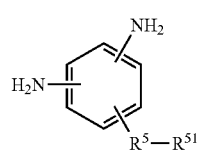

(ii-3)

wherein R$^5$ represents —O—, —COO—, —OCO—, —NHCO—, —CONH—, or —CO—; R$^{51}$ represents a monovalent group having a group selected from the group consisting of a steroid skeleton, a trifluoromethyl group, a fluoro group, a C$_2$-C$_{30}$ alkyl group, and a monovalent nitrogen-containing cyclic structure derived from the group consisting of pyridine, pyrimidine, triazine, piperidine and piperazine,

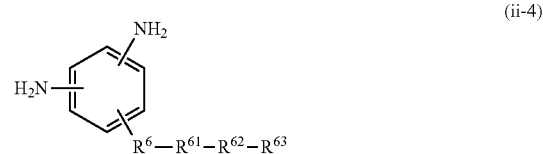

(ii-4)

wherein R$^6$ represents —O—, —COO—, —OCO—, —NHCO—, —CONH—, or —CO—; R$^{61}$ and R$^{62}$ respectively represent a divalent group which is selected from the group consisting of an alicyclic group, an aromatic group, and a heterocyclic group, and which is optionally substituted by, for example, halo; R$^{63}$ represents a C$_3$-C$_{18}$ alkyl group, a C$_3$-C$_{18}$ alkoxy group, a C$_1$-C$_5$ fluoroalkyl group, a C$_1$-C$_5$ fluoroalkoxy group, a cyano group, or a halogen atom,

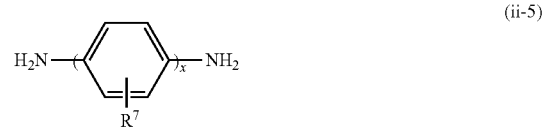

(ii-5)

wherein R$^7$ represents hydrogen, a C$_1$-C$_5$ acyl group, a C$_1$-C$_5$ alkyl group, a C$_1$-C$_5$ alkoxy group, or halogen; R$^7$ in each repeating unit may be the same or different; and x is an integer ranging from 1 to 3,

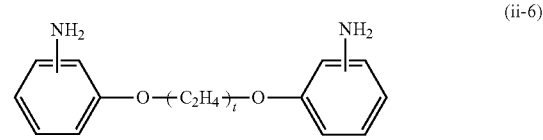

(ii-6)

wherein t is an integer ranging from 2 to 12,

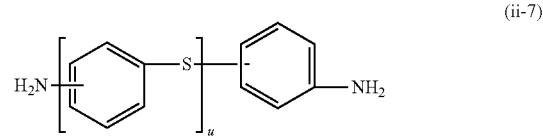

(ii-7)

wherein u is an integer ranging from 1 to 5,

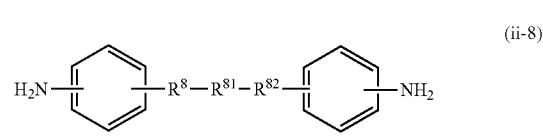

(ii-8)

wherein R$^8$ and R$^{82}$ may be the same or different, and respectively represent a divalent organic group; and R$^{81}$ represents a divalent group that has a ring structure containing a nitrogen atom and that is derived from the group consisting of pyridine, pyrimidine, triazine, piperidine and piperazine,

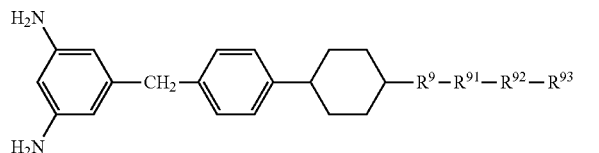
(ii-9)
wherein R⁹ represents —O— or cyclohexylene; R⁹¹ represents —CH₂—; R⁹² represents phenylene or cyclohexylene; and R⁹³ represents hydrogen or heptyl,
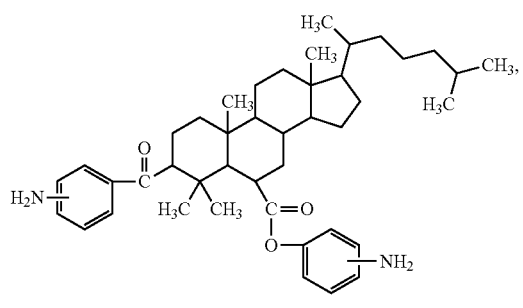
(ii-10)
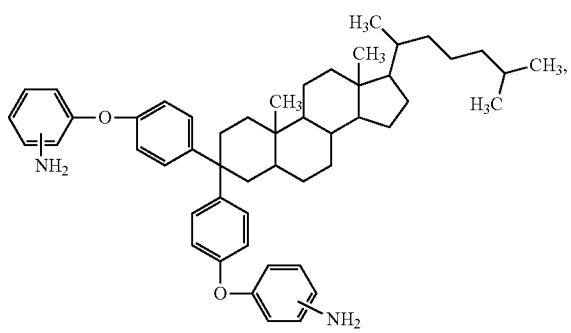
(ii-11)
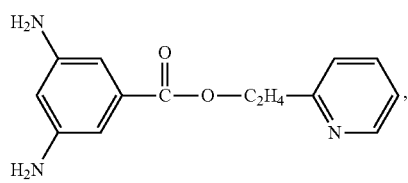
(ii-12)
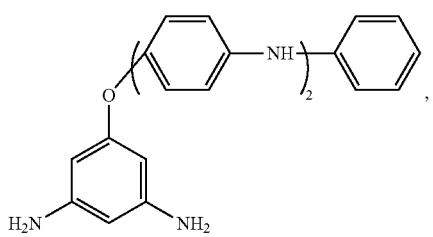
(ii-13)
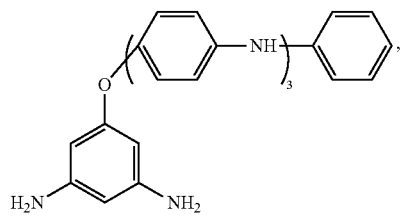
(ii-14)
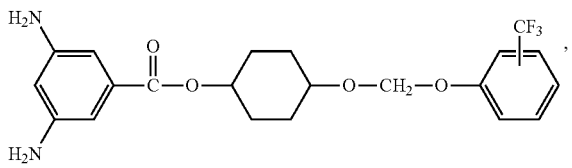
(ii-15)
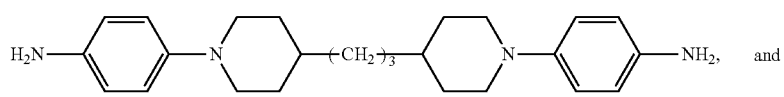
(ii-16) and
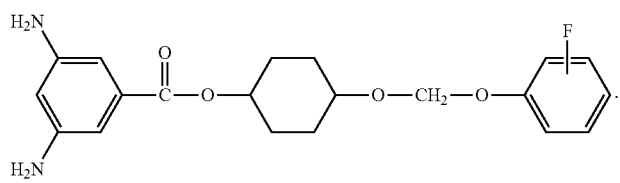
(ii-17)

Preferred examples of the diamine compounds represented by formula (ii-3) include 2,4-diaminophenyl ethyl formate, 3,5-diaminophenyl ethyl formate, 2,4-diaminophenyl propyl formate, 3,5-diaminophenyl propyl formate, 1-dodecoxy-2,4-aminobenzene, 1-hexadecoxy-2,4-aminobenzene, 1-octadecoxy-2,4-aminobenzene,

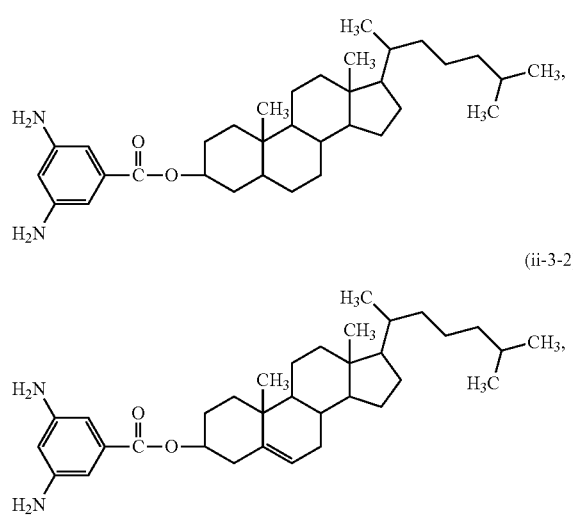
(ii-3-1)
(ii-3-2)

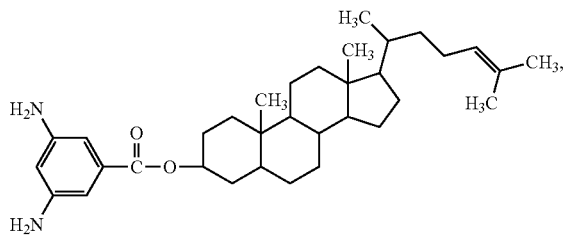
(ii-3-3)

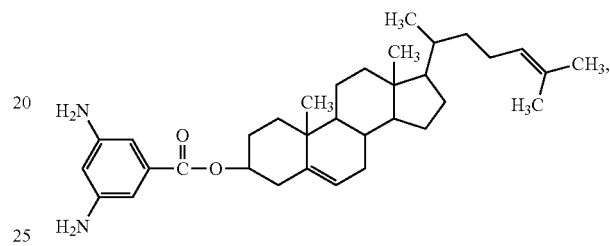
(ii-3-4)

and the like.

Preferred examples of the diamine compounds represented by formula (ii-4) include

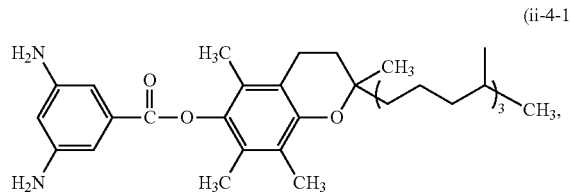
(ii-4-1)

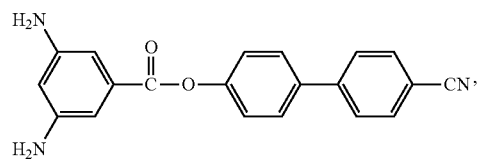
(ii-4-2)

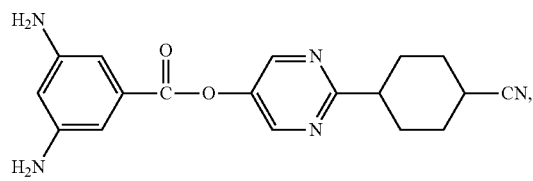
(ii-4-3)

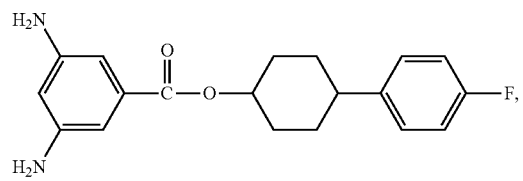
(ii-4-4)

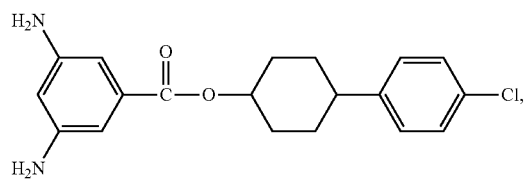
(ii-4-5)

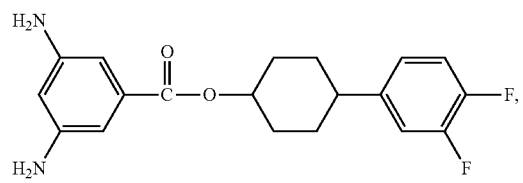
(ii-4-6)

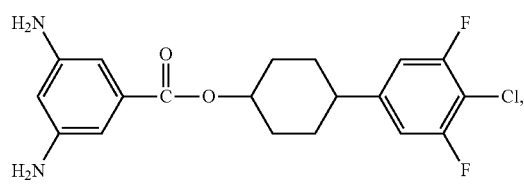
(ii-4-7)

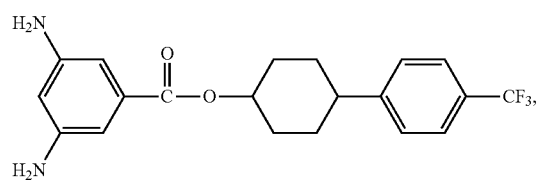
(ii-4-8)

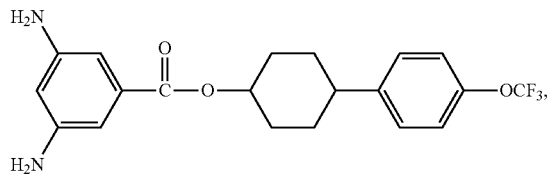
(ii-4-9)

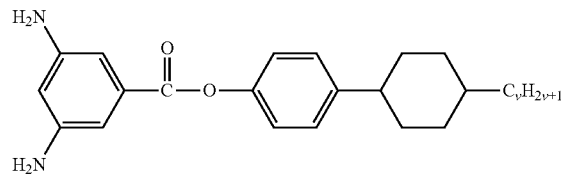
(ii-4-10)

(wherein v represents an integer ranging from 3 to 12), (wherein v represents an integer ranging from 3 to 12),

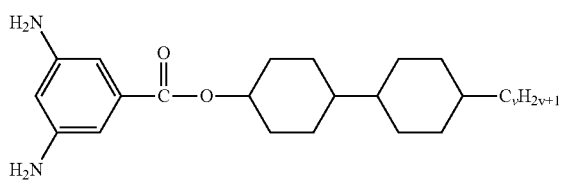
(ii-4-11)

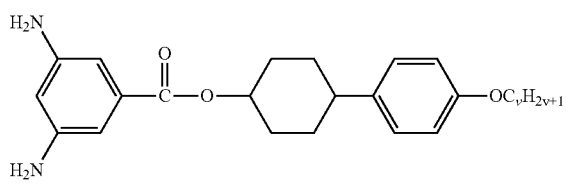
(ii-4-13)

(wherein v represents an integer ranging from 3 to 12),

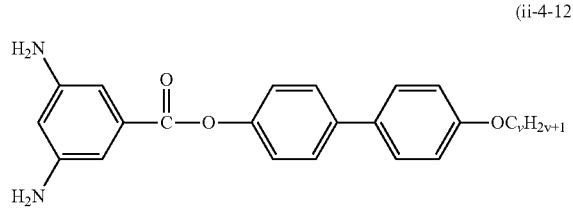
(ii-4-12)

(wherein v represents an integer ranging from 3 to 12), and the like.

Preferred examples of the diamine compounds represented by formula (ii-5) include: (1) p-diaminobenzene, m-diaminobenzene, o-diaminobenzene, 2,5-diaminotoluene, or the like when n is 1; (2) 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphehyl, 2,2',5,5'-tetrachloro-4,4'-diaminobiphenyl, 2,2'-dichloro-4,4'-diamino-5,5'-dimethoxybiphenyl, 4,4'-diamino-2,2'-bis(trichloromethyl)biphenyl, or the like when n is 2; and (3) 1,4-bis(4'-aminophenyl)benzene, or the like when n is 3.

Preferably, the diamine compound represented by formula (ii-7) is 4,4'-diaminodiphenylsulfide.

Preferably, the diamine compound represented by formula (ii-9) is selected from

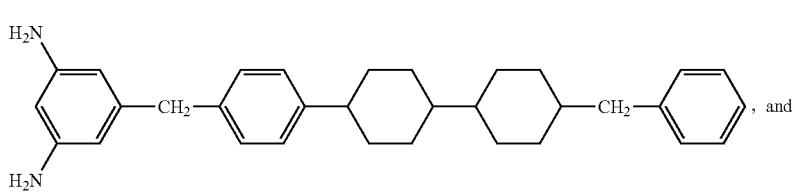
(ii-9-1)

, and

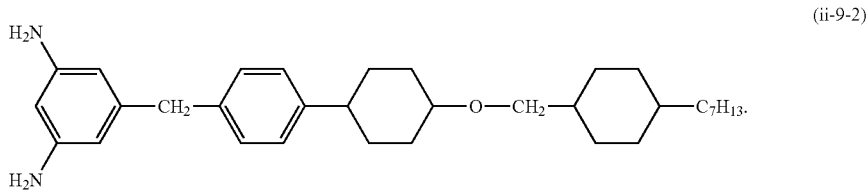
(ii-9-2)

Preferred examples of the further diamine compound suitable for the present invention include, but are not limited to, 1,2-diaminoethane, 4,4'-diaminodicyclohexylmethane, 4,4'-diaminodiphenylmethane, 4,4'-diaminodiphenylether, 5-[4-(4-n-pentylcyclohexyl)cyclohexyl]phenylmethylene-1,3-diaminobenzene, 1,1-bis[4-4-aminophenoxy)phenyl]-4-(4-ethylphenyl)cyclohexane, 2,4-diaminophenylformic acid ethyl ester, the diamine compounds represented by formulae (ii-3-1), (ii-3-2), (ii-4-1), and (ii-4-11), p-diaminobenzene, m-diaminobenzene, o-diaminobenzene, the diamine compound represented by formula (ii-9-1), and the like.

The diamine compound of formula

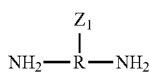

is used in an amount ranging preferably from 10 moles to 100 moles, and more preferably from 20 moles to 100 moles based on 100 moles of the diamine component.

Polysiloxane:

Polysiloxane containing the group $Z_2$ is obtained by reacting a bifunctional compound containing the group $Z_2$ and a group $A_1$ with a siloxane prepolymer containing a group $A_2$, wherein $Z_2$ is as defined above, $A_1$ is a first active group, and $A_2$ is a second active group reactive with $A_1$ to undergo a reaction to form the polysiloxane.

Preferably, the group $Z_2$ is an epoxy-containing group, an isocyanate-containing group, or a carboxyl-containing group. The group $A_1$ is a hydroxyl-containing group, and the group $A_2$ is an alkoxy-containing group.

The group $Z_2$ is chosen according to the group $Z_1$, and the group $A_1$ is chosen according to the group $A_2$.

The equivalent ratio of the group $A_1$ to the group $A_2$ is in a range preferably from 0.01 to 0.5, and more preferably 0.03 to 0.4. When the equivalent ratio of the group $A_1$ to the group $A_2$ is in the range defined above, the reactivity of the polysiloxane with the polymerization reaction product containing the group $Z_1$ (i.e., the aforesaid step (b)) can be enhanced, and the flexible substrate obtained thereafter has superior mechanical property.

Examples of the catalyst used for the reaction to obtain the polysiloxane include, but are not limited to, metals, such as lithium, sodium, potassium, rubidium, cesium, magnesium, calcium, barium, strontium, zinc, aluminum, titanium, cobalt, tin, lead, germanium, antimony, arsenic, cerium, boron, cadmium, manganese, or the like; halides of the aforesaid metals; oxides of the aforesaid metals; salts of the aforesaid metals; alkoxides of the aforesaid metals; and combinations thereof. Concrete examples of the catalyst include dibutyltin dilaurate and stannous octoate.

The reaction to obtain polysiloxane is conducted at a temperature ranging preferably from 50° C. to 150° C., and more preferably from 70° C. to 110° C. When the reaction to obtain polysiloxane is conducted at the temperature defined above, self-polymerization of siloxane prepolymer can be reduced, and the increase of the viscosity of the reaction medium, which may lead to inferior reactivity, can be avoided. The reaction to obtain polysiloxane is conducted for a period ranging preferably from 1 hour to 15 hours.

Bifunctional Compound:

Preferably, the bifunctional compound used in the present invention means that the compound has two kinds of functional groups, i.e., the group $Z_2$ and the group $A_1$. Examples of the bifunctional compound includes a hydroxyl-group-containing epoxy compound, a hydroxyl-group-containing isocyanate compound, and a hydroxyl-group-containing carboxylic acid compound. Examples of the hydroxyl-group-containing epoxy compound include, but are not limited to, (1) a glycidyl ether compound having a terminal hydroxyl group obtained by reacting epichlorohydrin, water, and dihydric alcohol or dihydroxyphenol; (2) a polyglycidyl ether compound having a terminal hydroxyl group obtained by reacting epichlorohydrin with polyhydric alcohol (for example, glycerin, pentaerythritol, or the like); (3) an epoxy compound having a terminal hydroxyl group obtained by reacting epichlorohydrin with an amino alcohol compound; (4) a hydroxyl-group-containing alicyclic hydrocarbon epoxide; and (5) a hydroxyl-group-containing epoxy compound of formula (III),

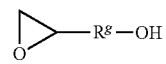

wherein $R^g$ represents a $C_1$-$C_{13}$ alkylene group.

Concrete examples of the hydroxyl-group-containing epoxy compound include 4-hydroxyphenylglycidyl ether, 4-(hydroxymethyl)phenylglycidyl ether, 1,3-bis(glycidyloxy)-2-propanol, 2,2-bis(glycidyloxymethyl)-3-(glycidyloxy)-1-propanol, epoxidized tetrahydro benzyl alcohol, 2,3-epoxy-1-cyclohexanol, glycidol (for example, EPIOL OH manufactured by NOF Co., Ltd.), 8-oxiranyl-1-octanol, 9-oxiranyl-1-nonanol, EOA (manufactured by kuraray Co., Ltd.), and the like. The aforesaid concrete examples can be used alone or in combinations thereof.

Example of the hydroxyl-group-containing isocyanate compound includes, but are not limited to, a hydroxyl-group-containing isocyante compound of formula (IV),

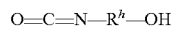

wherein $R^h$ represents a $C_2$-$C_{12}$ alkylene group.

Concrete examples of the hydroxyl-group-containing isocyanate compound include 2-hydroxyethyl isocyanate, 3-hydroxypropyl isocyanate, 4-hydroxybutyl isocyanate, 6-hydroxyhexyl isocyanate, 8-hydroxyoctyl isocyanate, 10-hydroxydecyl isocyanate, 12-hydroxydodecyl isocyanate, and the like. The aforesaid concrete examples can be used alone or in combinations thereof.

Examples of the hydroxyl-group-containing carboxylic acid compound include, but are not limited to hydroxyl-group-containing carboxylic acid compounds of formula (V) to (VII),

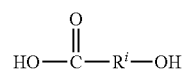

wherein
$R^i$ represents a $C_1$-$C_{11}$ linear or branched alkylene group;

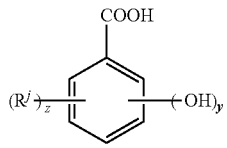
(VI)

wherein
$R^j$ represents a $C_1$-$C_3$ alkyl group, y represents an integer ranging from 1 to 3, and z represents an integer ranging from 0 to 2;

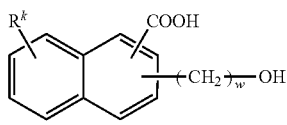
(VII)

wherein
$R^k$ represents hydrogen or methyl, and w represents 0 or 1.

Concrete examples of the hydroxyl-group-containing carboxylic acid compound include hydroxyacetic acid, lactic acid, 2-hydroxybutyric acid, 2-hydroxy-2-methyl propanoic acid, 12-hydroxylauric acid, 3-hydroxybenzoic acid, 4-hydroxybenzoic acid, 2,4-dihydroxybenzoic acid, 2,5-dihydroxybenzoic acid, 2,6-dihydroxybenzoic acid, 3,5-dihydroxybenzoic acid, 2,4-dimethyl-6-hydroxybenzoic acid, 2,4-dihydroxy-6-propylbenzoic acid, salicylic acid, 3-methylsalicylic acid, 5-methylsalicylic acid, gallic acid, 1-hydroxy-2-naphthoic acid, 1-hydroxy-4-naphthoic acid, 1-hydroxy-5-naphthoic acid, 1-hydroxy-8-naphthoic acid, 2-hydroxy-1-naphthoic acid, 2-hydroxy-3-naphthoic acid, 2-hydroxy-6-naphthoic acid, 2-hydroxy-7-naphthoic acid, 4-hydroxymethyl-1-naphthoic acid, 8-hydroxymethyl-1-naphthoic acid, 1-hydroxy-6-methyl-2-naphthoic acid and the like. The aforesaid concrete examples can be used alone or in combinations thereof.

Preferable examples of the bifunctional compound include, but are not limited to, 4-hydroxyphenylglycidyl ether, glycidol, 8-oxiranyl-1-octanol, 2-hydroxylethyl isocyanate, 6-hydroxyhexyl isocyanate, 4-hydroxybenzoic acid, 2,4-dihydroxybenzoic acid, salicylic acid, 1-hydroxy-2-naphthoic acid.

Siloxane Prepolymer:

Siloxane prepolymer is obtained by subjecting silane monomer to hydrolysis followed by partial polycondensation. The silane monomer is preferably represented by formula (VIII):

$$R^l_m Si(OR^m)_{4-m} \quad \text{(VIII)}$$

wherein
$R^l$ represents a $C_1$-$C_8$ alkyl group or a $C_6$-$C_8$ aryl group;
m represents 0 or 1; and
$R^m$ represents a $C_1$-$C_4$ alkyl group, and may be the same or different when 4-m is 3 or 4.

When m is 0, the silane monomer is tetrafunctional silane, such as tetramethoxysilane, tetraethoxysilane, tetrapropoxysilane, tetra-i-propoxysilane, or the like. When m is 1, the silane monomer is trifunctional silane, such as methyltrimethoxysilane, methyltriethoxysilane, methyltripropoxysilane, methyltributoxysilane, ethyltrimethoxysilane, ethyltriethoxysilane, propyltrimethoxysilane, propyltriethoxysilane, i-propyltrimethoxysilane, i-propyltriethoxysilane, or the like. The aforesaid silane monomers can be used alone or in combinations thereof.

Hydrolysis and partial condensation can be implemented in a general manner. For example, the silane monomer is added with solvent, water, and optional catalyst, followed by a heating treatment to obtain the siloxane prepolymer. The solvent and the catalyst are not specifically limited.

The number average molecular weight of the siloxane prepolymer is preferably from 230 to 2,000. The average number of silicon atoms in each siloxane prepolymer molecule is preferably from 2 to 11. The group $A_2$ contained in the siloxane prepolymer is in an amount ranging preferably from 50 moles to 95 moles, and more preferably from 60 moles to 90 moles, based on 100 moles of the siloxane prepolymer.

Flexible Substrate and Preparation Thereof:

A flexible substrate is formed from the polysiloxane-grafted polyimide resin composition of the present invention. Specifically, the polysiloxane-grafted polyimide resin composition of the present invention is applied on a substrate board followed by drying and curing the resin composition to form the flexible substrate on the substrate board. The flexible substrate is then removed from the substrate board.

The polysiloxane-grafted polyimide resin composition of the present invention can be applied on the substrate board using a coating method commonly used in the art, such as spin coating, cast coating, roll coating, or the like.

Drying can be implemented in a manner well known in the art so as to remove the solvent. Drying is implemented at a drying temperature from 50° C. to 200° C. for a period ranging from 1 minute to 1 hour.

Curing can be implemented in a manner well known in the art so as to conduct sol-gel curing of alkoxysilyl and to remove residual solvent. Curing is implemented at a curing temperature from 150° C. to 500° C. for a period ranging from 10 minutes to 2 hours.

The flexible substrate can be removed from the substrate board in a manner well known in the art, for example, stripping, dry-etching, wet-etching, or the like.

Examples of the substrate board suitable for the present invention include alkali-free glass, soda-lime glass, Pyrex glass, quartz glass, or a silicon wafer.

The thermal expansion coefficient of the flexible substrate is preferably less than 30 ppm/° C.

The flexible substrate formed from the polysiloxane-grafted polyimide resin composition of the present invention is useful on a substrate of a flexible liquid crystal display or an electronic book.

EXAMPLES

Preparation of Polysiloxane

Preparation Example 1

A 500 ml three-necked conical flask equipped with a nitrogen inlet and a stirrer was purged with nitrogen, and was added with glycidol (commercially available as EPIOL OH manufactured by NOF Co., Ltd., 1420 g) and tetramethoxysilane partial condensate (commercially available as M Silicate 51 manufactured by Tama Chemicals Co., Ltd., 9000 g), followed by continuous stirring and heating to 90° C. Dibutyltin dilaurate (2 g) was then added. The contents of the flask were cooled to room temperature after about 620 g of methanol was distillated out. About 100 g of methanol was further removed via distillation under a reduced pressure of 13 kPa to obtain polysiloxane. The equivalent ratio of hydroxyl group of glycidol to methoxy group the tetramethoxysilane partial condensate is 0.11.

Preparation Example 2

A 500 ml three-necked conical flask equipped with a nitrogen inlet and a stirrer was purged with nitrogen, and was added with glycidol (commercially available as EPIOL OH manufactured by NOF Co., Ltd., 1420 g) and methyltrimethoxysilane partial condensate (commercially available as MTMS-B manufactured by Tama Chemicals Co., Ltd., 9000 g), followed by continuous stirring and heating to 90° C. Dibutyltin dilaurate (1.8 g) was then added. The contents of the flask were cooled to room temperature after about 630 g of methanol was distillated out. About 30 g of methanol was further removed via distillation under a reduced pressure of 13 kPa to obtain polysiloxane. The equivalent ratio of hydroxyl group of glycidol to methoxy group of the methyltrimethoxysilane partial condensate is 0.06.

Preparation Example 3

A 500 ml three-necked conical flask equipped with a nitrogen inlet and a stirrer was purged with nitrogen, and was added with 2-hydroxyethyl isocyanate (1757 g) and tetramethoxysilane partial condensate (commercially available as M Silicate 51 manufactured by Tama Chemicals Co., Ltd., 4520 g), followed by continuous stirring and heating to 90° C. Dibutyltin dilaurate (1.2 g) was then added. The contents of the flask were cooled to room temperature after about 590 g of methanol was distillated out. About 25 g of methanol was further removed via distillation under a reduced pressure of 13 kPa to obtain isocyanate-containing polysiloxane. The equivalent ratio of hydroxyl group of 2-hydroxyethyl isocyanate to methoxy group of the tetramethoxysilane partial condensate is 0.21.

Preparation Example 4

A 500 ml three-necked conical flask equipped with a nitrogen inlet and a stirrer was purged with nitrogen, and was added with 4-hydroxybenzoic acid (2623 g) and methyltrimethoxysilane partial condensate (commercially available as MTMS-A manufactured by Tama Chemicals Co., Ltd., 3380 g), followed by continuous stirring and heating to 90° C. Dibutyltin dilaurate (2.1 g) was then added. The contents of the flask were cooled to room temperature after about 620 g of methanol was distillated out. About 32 g of methanol was further removed via distillation under a reduced pressure of 13 kPa to obtain carboxyl-containing polysiloxane. The equivalent ratio of hydroxyl group of 4-hydroxybenzoic acid to methoxy group of the methyltrimethoxysilane partial condensate is 0.36.

Preparation of Polysiloxane-Grafted Polyimide Resin

Example 1

A 500 ml four-necked conical flask equipped with a nitrogen inlet, a stirrer, a heater, a condenser, and a thermometer was purged with nitrogen, and was added with 3,3'-dihydroxy-4,4'-diaminobiphenyl (86.5 g, 0.4 mole), 4,4'-diaminodiphenylether (20.1 g, 0.1 mole), and N-methylpyrrolidone (700 g), followed by stirring at 60° C. until dissolution. 2,3,5-tricarboxylcyclopentyl-acetic dianhydride (112.2 g, 0.5 mole) and N-methylpyrrolidone (300 g) were then added, followed by a reaction at room temperature for 6 hours. N-methylpyrrolidone (950 g), acetic anhydride (56.1 g), and pyridine (197.5 g) were then added, followed by stirring at 60° C. for 4 hours so as to obtain a polymerization reaction product containing hydroxy group.

The obtained polymerization reaction product containing hydroxy group was heated to 90° C., followed by adding with polysiloxane produced in Preparation Example (40 g) and 2-methylimidazole (0.25 g). Reaction was conducted at 80° C. for 6 hours, followed by cooling to room temperature to obtain a polysiloxane-grafted polyimide resin.

Examples 2 to 9 and Comparative Examples 1 to 4

Examples 2 to 9 and Comparative Examples 1 to 4 were conducted in a manner identical to Example 1 using the components and the reaction conditions shown in Table 1 to prepare polysiloxane-grafted polyimide resins.

TABLE 1

| Components | | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 | Comp. Ex. 4 |
|---|---|---|---|---|---|---|---|---|---|---|---|---|---|---|
| Diamine components (moles) | b-1-1 | 0.4 | — | 0.1 | — | — | — | — | — | — | — | — | 0.4 | — |
| | b-1-2 | — | 0.2 | — | — | — | — | — | 0.5 | — | — | — | — | — |
| | b-1-3 | — | — | 0.1 | 0.3 | — | — | 0.2 | — | — | — | — | — | — |
| | b-1-4 | — | — | — | — | 0.5 | — | — | — | — | — | — | — | — |
| | b-1-5 | — | — | — | — | — | 0.1 | — | — | — | — | — | — | — |
| | b-1-6 | — | — | — | — | — | — | — | — | 0.4 | — | — | — | — |
| | b-2-1 | 0.1 | 0.1 | 0.3 | — | — | 0.4 | 0.2 | — | 0.1 | 0.5 | 0.3 | 0.1 | 0.5 |
| | b-2-2 | — | 0.2 | — | 0.2 | — | — | 0.1 | — | — | — | 0.2 | — | — |
| Tetracarboxylic anhydride components (moles) | a-1 | 0.5 | — | — | 0.5 | — | 0.2 | — | — | 0.2 | 0.5 | 0.5 | 0.5 | — |
| | a-2 | — | 0.5 | 0.5 | — | 0.4 | 0.3 | 0.5 | — | — | — | — | — | 0.4 |
| | a-3 | — | — | — | — | 0.1 | — | — | 0.5 | 0.3 | — | — | — | 0.1 |
| Dehydration/ring-closure reaction | Temp. (° C.) | 60 | 50 | 70 | 60 | 55 | 50 | 60 | 50 | 60 | 60 | 60 | 60 | 55 |
| | Time (hr) | 4 | 4 | 5 | 5 | 3 | 3 | 3 | 4 | 4 | 4 | 5 | 4 | 3 |
| Polysiloxane (g) | Prep. Ex. 1 | 40 | 40 | — | — | — | — | — | — | — | 40 | — | — | — |
| | Prep. Ex. 2 | — | — | 30 | — | — | — | — | — | 40 | — | 40 | — | — |
| | Prep. Ex. 3 | — | — | — | 40 | 30 | 40 | — | — | — | — | — | 40 | — |
| | Prep. Ex. 4 | — | — | — | — | — | — | 40 | 40 | — | — | — | — | — |

TABLE 1-continued

| Components | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 | Comp. Ex. 4 |
|---|---|---|---|---|---|---|---|---|---|---|---|---|---|
| Equivalent ratio of group $A_1$/group $A_2$ | 0.11 | 0.11 | 0.06 | 0.21 | 0.21 | 0.36 | 0.36 | 0.36 | 0.06 | 0.11 | 0.21 | — | — |
| The amount of polysiloxane-grafted polyimide resin of formula (1) (wt %) | 90 | 80 | 97 | 92 | 78 | 70 | 85 | 80 | 90 | 0 | 0 | 0 | 0 |
| The amount of silicon of polysiloxane-grafted polyimide resin of formula (1) (mole) | 9.6 | 4.9 | 5.1 | 6.9 | 12.8 | 2.4 | 2.6 | 6.7 | 10.8 | 0 | 0 | 0 | 0 | b-1-1: 3,3'-dihydroxy-4,4'-diaminobiphenyl
b-1-2: 2-hydroxy-p-diaminobenzene
b-1-3: 3,3'-dihydroxy-4,4'-diaminodiphenylether
b-1-4: 3,3'-dicarboxyl-4,4'-diaminodiphenylpropane
b-1-5: 3,3'-dicarboxyl-4,4'-diaminobiphenyl
b-1-6: 2,5-dicarboxyl-p-diaminobenzene
b-2-1: 4,4'-diaminodiphenylether
b-2-2: p-diaminobenzene
a-1: 2,3,5-tricarboxylcyclopentylacetic dianhydride
a-2: pyromellitic dianhydride
a-3: 1,2,3,4-cyclobutanetetracarboxylic dianhydride Preparation of Flexible Substrate Application Example 1

The polysiloxane-grafted polyimide resin obtained in Example 1 (100 parts by weight) and ethylene glycol n-butylether (800 parts by weight) were mixed to obtain a polysiloxane-grafted polyimide resin composition.

The polysiloxane-grafted polyimide resin composition was applied on a glass substrate board of 100 mm×100 mm×0.7 mm by spin coating to form a film on the substrate board. The film was dried at 110° C. for 2 minutes and was then baked at 220° C. for 30 minutes to obtain a substrate body including a flexible substrate disposed on the substrate board. The substrate body was evaluated according to the following evaluation methods. The results are shown in Table 2.

Application Examples 2 to 10 and Comparative Application Examples 1 to 4

Application Examples 2 to 10 and Comparative Application Examples 1 to 4 were conducted in a manner identical to Application Example 1 using the components and the amounts thereof shown in Table 2 to obtain the flexible substrates. The flexible substrates thus obtained were evaluated according to the following evaluation methods. The results are shown in Table 2.

[Evaluated Items]
1. Thermal expansion coefficient ($\alpha$):

The thermal expansion coefficient ($\alpha$, ppm/° C.) at a temperature from 100° C. to 200° C. of the flexible substrate of each of the substrate bodies obtained in Application Examples 1 to 10 and Comparative Application Examples 1 to 4 was determined using a thermo mechanical analyzer (manufactured by Seiko, Model No. TMA120C), and was evaluated as follows.

⊚: $\alpha<25$;
○: $30>\alpha\geq25$;
△: $40>\alpha\geq30$;
X: $\alpha\geq40$.

2. Tensile Breaking Strength ($\sigma$):

The tensile breaking strength ($\sigma$, GPa) of the flexible substrate of each of the substrate bodies obtained in Application Examples 1 to 10 and Comparative Application Examples 1 to 4 was determined three times at room temperature using a tensile strength tester (manufactured by ORIENTECH, Model No. UCT-500, tensile speed: 50 mm/min). An average tensile breaking strength of each of the flexible substrates was evaluated as follows.

○: $0.15<\sigma\leq0.2$;
△: $0.1<\sigma\leq0.15$;
X: $\sigma\leq0.1$.

TABLE 2

| Components (Parts by weight) | | App. Ex. 1 | App. Ex. 2 | App. Ex. 3 | App. Ex. 4 | App. Ex. 5 | App. Ex. 6 | App. Ex. 7 | App. Ex. 8 | App. Ex. 9 | App. Ex. 10 | Comp. App. Ex. 1 | Comp. App. Ex. 2 | Comp. App. Ex. 3 | Comp. App. Ex. 4 |
|---|---|---|---|---|---|---|---|---|---|---|---|---|---|---|---|
| Ex. | 1 | 100 | — | — | — | — | 70 | — | — | — | — | — | — | — | — |
| | 2 | — | 100 | — | — | — | — | — | — | — | — | — | — | — | — |
| | 3 | — | — | 100 | — | — | 30 | — | — | — | — | — | — | — | — |
| | 4 | — | — | — | 100 | — | — | — | — | — | — | — | — | — | — |
| | 5 | — | — | — | — | 100 | — | — | — | — | — | — | — | — | — |
| | 6 | — | — | — | — | — | — | 100 | — | — | — | — | — | — | — |
| | 7 | — | — | — | — | — | — | — | 100 | — | — | — | — | — | — |
| | 8 | — | — | — | — | — | — | — | — | 100 | — | — | — | — | — |
| | 9 | — | — | — | — | — | — | — | — | — | 100 | — | — | — | — |
| Comp. Ex. | 1 | — | — | — | — | — | — | — | — | — | — | 100 | — | — | — |
| | 2 | — | — | — | — | — | — | — | — | — | — | — | 100 | — | — |

TABLE 2-continued

| Components (Parts by weight) | | App. Ex. 1 | 2 | 3 | 4 | 5 | 6 | 7 | 8 | 9 | 10 | Comp. App. Ex. 1 | 2 | 3 | 4 |
|---|---|---|---|---|---|---|---|---|---|---|---|---|---|---|---|
| | 3 | — | — | — | — | — | — | — | — | — | — | — | — | 100 | — |
| | 4 | — | — | — | — | — | — | — | — | — | — | — | — | — | 100 |
| Solvent | 1-1 | 800 | 700 | — | — | 1000 | 400 | 600 | 750 | — | — | 800 | 800 | — | — |
| | 1-2 | — | — | 800 | 650 | — | 600 | — | — | 850 | — | — | — | 800 | 650 |
| | 1-3 | — | — | — | — | — | — | 250 | — | — | 800 | — | — | — | — |
| Additives | 2-1 | — | — | — | 8 | — | — | 15 | — | — | — | — | — | — | 8 |
| | 2-2 | — | 5 | — | — | 2 | — | — | — | — | — | — | — | — | — |
| | 2-3 | — | — | — | — | 3 | — | — | — | — | — | — | — | — | — |
| Evaluation results | α | ○ | ○ | ○ | ◉ | ○ | ○ | ◉ | ○ | ○ | ○ | X | X | X | X |
| | σ | ○ | ○ | ○ | ○ | ○ | ○ | ○ | ○ | ○ | ○ | X | X | X | X |

α: thermal expansion coefficient
σ: tensile breaking strength
1-1: ethylene glycol n-butyl ether
1-2: N-methyl-2-pyrrolidone
1-3: γ-butyrolactone
2-1: filler IPA-ST (silicon dioxide, particle size: 12 nm, manufactured by Nissan Chemical)
2-2: adhesion promoter KBM-403 (manufactured by Shin-Etsu Chemical Co., Ltd.)
2-3: antioxidant BHT (manufactured by TCI)

As shown in Table 2, in Application Examples 1 to 10, the polyimide resin used in the polysiloxane-grafted polyimide resin composition contains a polysiloxane-containing group which is bonded to diamine moiety of polyimide resin. The flexible substrates obtained from the polysiloxane-grated polyimide resin composition of the present invention have superior thermal expansion coefficient and tensile breaking strength.

However, in Comparative Application Examples 1 and 2, as disclosed in JP 2002-293933, although the polyimide resin contains a polysiloxane-containing group, the polysiloxane-containing group is bonded to carboxyl group of tetracarboxylic dianhydride moiety of polyimide resin. The flexible substrates obtained from the polyimide resin compositions have inferior thermal expansion coefficient and tensile breaking strength.

In Comparative Application Examples 3 and 4, the polyimide resin does not contain a polysiloxane-containing group. The flexible substrates obtained from the polyimide resin compositions have inferior thermal expansion coefficient and tensile breaking strength.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A polysiloxane-grafted polyimide resin composition comprising:
a polysiloxane-grafted polyimide resin of formula (I):

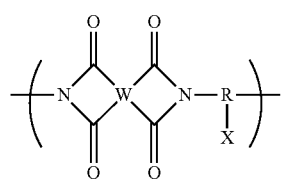

(I)

wherein
W represents a tetravalent organic group,
R represents a trivalent organic group, and
X represents a polysiloxane-containing group;
and
a solvent,
wherein X is represented by the following formula:

$$-X^1-X^2$$

wherein
$X^1$ represents a formula of

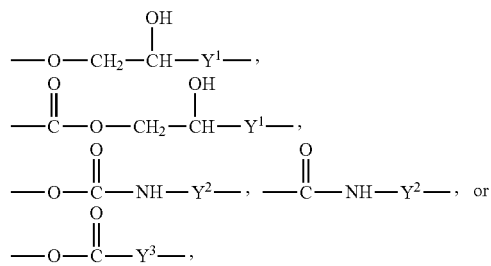

wherein $Y^1$ and $Y^3$ independently represent an unsubstituted or substituted $C_1$-$C_{13}$ alkylene group, an unsubstituted or substituted $C_6$-$C_{12}$ arylene group, or an unsubstituted or substituted $C_7$-$C_{12}$ aralkylene group, and $Y^2$ represents an unsubstituted or substituted $C_1$-$C_{13}$ alkylene group, wherein part of methylene groups of said alkylene group is optionally replaced by oxygen atoms with the proviso that when some methylene groups are replaced by oxygen atoms, a structure in which two oxygen atoms adjoin together is excluded, and $X^2$ represents a polysiloxanyl group.

2. The polysiloxane-grafted polyimide resin composition as claimed in claim 1, wherein said trivalent organic group is selected from the group consisting of a trivalent aliphatic group, a trivalent alicyclic group, a trivalent aromatic group, and combinations thereof.

3. The polysiloxane-grafted polyimide resin composition as claimed in claim 1, wherein said polysiloxane-containing group has a silicon content ranging from 0.005 mole to 35 moles based on 1 mole of said polysiloxane-grafted polyimide resin.

4. The polysiloxane-grafted polyimide resin composition as claimed in claim 1, wherein said polysiloxane-grafted polyimide resin is obtained by a process including the steps of:

(a) subjecting a tetracarboxylic dianhydride component of formula

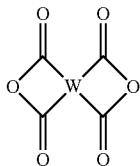

and a diamine component including a diamine compound of formula

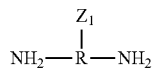

to a polymerization reaction followed by a dehydration/ring-closure reaction to form a polymerization reaction product of formula

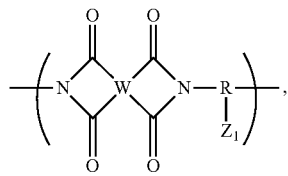

wherein
W and R are as defined in claim 1, and
$Z_1$ is a monovalent group; and
(b) subjecting said polymerization reaction product and polysiloxane containing a group $Z_2$ to a reaction to produce said polysiloxane-grafted polyimide resin,
wherein
$Z_2$ is a monovalent group reactive with $Z_1$ to undergo said reaction.

5. The polysiloxane-grafted polyimide resin composition as claimed in claim 4, wherein said polysiloxane is obtained by reacting a bifunctional compound containing said group $Z_2$ and a group $A_1$ with a siloxane prepolymer containing a group $A_2$, wherein
$Z_2$ is as defined in claim 4,
$A_1$ is a first active group, and
$A_2$ is a second active group reactive with $A_1$ to undergo a reaction to form said polysiloxane.

6. The polysiloxane-grafted polyimide resin composition as claimed in claim 5, wherein an equivalent ratio of $A_1$ to $A_2$ is in a range from 0.01 to 0.5.

7. The polysiloxane-grafted polyimide resin composition as claimed in claim 5, wherein said bifunctional compound is selected from the group consisting of a hydroxyl-group-containing epoxy compound, a hydroxyl-group-containing isocyanate compound, a hydroxyl-group-containing carboxylic acid compound and combinations thereof.

8. The polysiloxane-grafted polyimide resin composition as claimed in claim 1, further comprising a polysiloxane-grafted polyamic acid resin of formula (II)

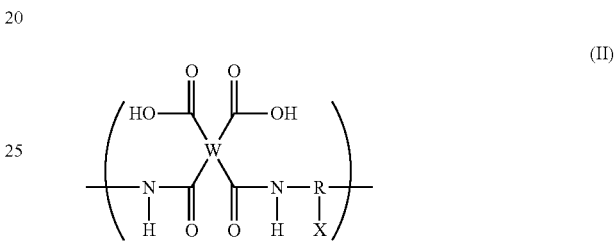

wherein
W, R, and X are as defined in claim 1.

9. The polysiloxane-grafted polyimide resin composition as claimed in claim 8, wherein said polysiloxane-grafted polyimide resin is in an amount not less than 70 wt % based on 100 wt % of a combination of said polysiloxane-grafted polyimide resin and said polysiloxane-grafted polyamic acid resin.

10. The polysiloxane-grafted polyimide resin composition as claimed in claim 1, further comprising a filler.

11. A flexible substrate formed from the polysiloxane-grafted polyimide resin composition as claimed in claim 1.

12. The flexible substrate as claimed in claim 11, which has a thermal expansion coefficient not greater than 30 ppm/° C.

* * * * *